(No Model.)
A. J. DISBROW.
DEVICE FOR PICKING CRANBERRIES.
No. 378,775. Patented Feb. 28, 1888.
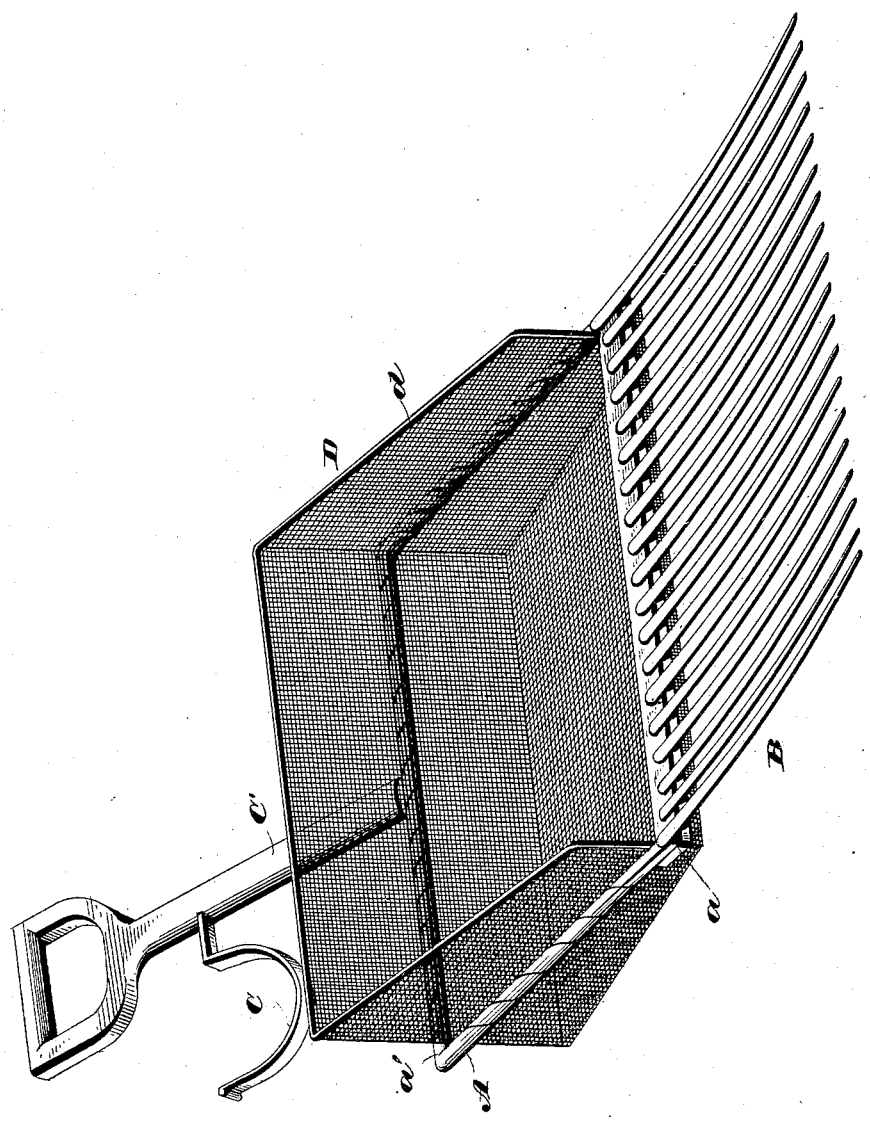
WITNESSES.
G. S. Elliott
E. W. Johnson
Andrew J. Disbrow.
INVENTOR,
Attorney.

United States Patent Office.

ANDREW J. DISBROW, OF OLD BRIDGE, NEW JERSEY.

DEVICE FOR PICKING CRANBERRIES.

SPECIFICATION forming part of Letters Patent No. 378,775, dated February 28, 1888.

Application filed November 24, 1886. Serial No. 219,812. (No model.)

*To all whom it may concern:*

Be it known that I, ANDREW J. DISBROW, a citizen of the United States of America, residing at Old Bridge, in the county of Middlesex and State of New Jersey, have invented certain new and useful Improvements in Devices for Picking Cranberries; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

My invention relates to certain new and useful improvements in devices for gathering berries or other fruits, the same being designed more especially for gathering cranberries, the object of my improvement being to provide a device which can be placed and held beneath the bush, said device carrying a receptacle into which the berries will fall when removed from the vines, the removal of the berries from the vines being accomplished either by hand or by the assistance of a rake which is operated by hand; and my invention consists in the construction and the combination of the parts, as will be hereinafter fully set forth.

In the accompanying drawing, which illustrates my invention, the figure is a perspective view of the gathering device which carries the receptacle.

A refers to a suitably-constructed rectangular frame, the front cross-bar, *a*, thereof being provided with projecting teeth B, which extend outward and downward therefrom, said teeth preferably tapering from the cross-bar to which they are secured to their points, and these teeth are placed at such a distance apart from each other that the berries will not fall through the same. The rear cross-bar, *a'*, of the rectangular frame A is provided centrally with an outwardly-projecting pin, upon which is secured a handle, C', said operating-handle having attached thereto at a suitable point between its ends a laterally-projecting bar, *c*, the outer end of which is preferably curved to form a concave, *c'*, to receive the leg of the operator.

D refers to a suitable receptacle, which is preferably made of wire-gauze, the upper and front edges of said receptacle being provided with a wire frame, *d*, for giving sufficient rigidity to the same. This receptacle is secured within the rectangular frame A by any suitable means, preferably by a wire which is passed through the meshes of the receptacle and around the rear and side bars of the frame, the front edge of said receptacle being attached to the cross-bar *a* in any suitable manner, so that the bottom of the receptacle will be below the plane of said cross-bar.

The manner of using my improved device is as follows: The teeth B are placed under the vines, between the bearing portions thereof and the ground, until the vines or bushes bear against the cross-bar *a*. The operator's hand is then removed from the handle and the lower portion of his leg placed in the concave *c'* of bar *c*, attached to the handle, so as to hold the device securely in place. A hand-rake or the operator's hand is then employed and the berries deposited in the wire-gauze receptacle, when, by simply shaking the same, the heavy particles of dirt will escape through the meshes of the gauze, and the lighter particles—such as leaves, &c.—are removed by subjecting the berries to a blast of air from a fan.

I am aware that prior to my invention it has been proposed to remove berries from vines by means of suitable rakes, and I do not claim such as my invention; but

What I claim as new, and desire to secure by Letters Patent, is—

A cranberry-gatherer consisting of a bent metal frame, A, to the front projecting ends of which is secured a transverse bar, *a*, carrying forward-projecting teeth B, a handle, C', attached to the rear bar, *a'*, and provided with a laterally-projecting bent bar, C, a wire-gauze receptacle, D, the edges of which are supported by a wire frame, *d*, said receptacle having inclined sides, as shown, the same being attached to the frame A so that the bottom thereof will be below the projecting teeth and the handle will incline upwardly, while the side and rear walls of the receptacle extend above and below the side and rear bars of the frame A, substantially as shown, and for the purpose set forth.

In testimony whereof I affix my signature in presence of two witnesses.

ANDREW J. DISBROW.

Witnesses:
WM. M. APPLEBY,
ALBERT APPLEBY.